United States Patent [19]

Langer et al.

[11] Patent Number: 4,749,262

[45] Date of Patent: Jun. 7, 1988

[54] METAL FILM LIGHT MODULATOR

[75] Inventors: Dietrich W. Langer, Yellow Springs; Sang B. Nam, Dayton, both of Ohio

[73] Assignee: United States of America as represented by the Secretary of the Air Force, Washington, D.C.

[21] Appl. No.: 885,103

[22] Filed: Jul. 14, 1986

[51] Int. Cl.⁴ .......................... G02F 1/01; G02F 1/03; G02F 1/05
[52] U.S. Cl. ...................................... 350/355; 350/356
[58] Field of Search .............. 350/355, 356, 393, 374, 350/376; 332/7.51

[56] References Cited

U.S. PATENT DOCUMENTS

| | | | |
|---|---|---|---|
| 3,421,002 | 1/1969 | Berger | 332/7.51 |
| 4,094,579 | 6/1978 | McMahon et al. | 350/96.17 |
| 4,143,263 | 3/1979 | Eichweber | 332/7.51 |
| 4,198,115 | 4/1980 | Kaminow | 350/96.14 |
| 4,249,796 | 2/1981 | Sincerbox et al. | 350/370 |
| 4,270,847 | 6/1981 | Meyer | 350/392 |
| 4,313,651 | 2/1982 | Miller, Jr. | 350/355 |

OTHER PUBLICATIONS

R. Dragila et al., "High Transparency of Classically Opaque Metallic Films", Phys. Rev. Lett. 55:10, 1117–1120, Sep. 2, 85.

Primary Examiner—Gene Wan
Assistant Examiner—Nathan W. McClutcheon
Attorney, Agent, or Firm—Bobby D. Scearce; Donald J. Singer

[57] ABSTRACT

An improved device for modulating the intensity of a light beam is described which comprises a first isoceles optical prism; a first dielectric layer, a thin metallic layer, and a second dielectric layer substantially identical in composition and thickness to the first dielectric layer deposited successively on the base of the first prism; a second isoceles optical prism disposed with the base thereof contacting the last deposited layer; and a controllable source of electrical current connected to the metallic layer for establishing and modulating an electro-magnetic field at the respective surfaces of the metallic layer.

4 Claims, 1 Drawing Sheet

U.S. Patent   Jun. 7, 1988   4,749,262
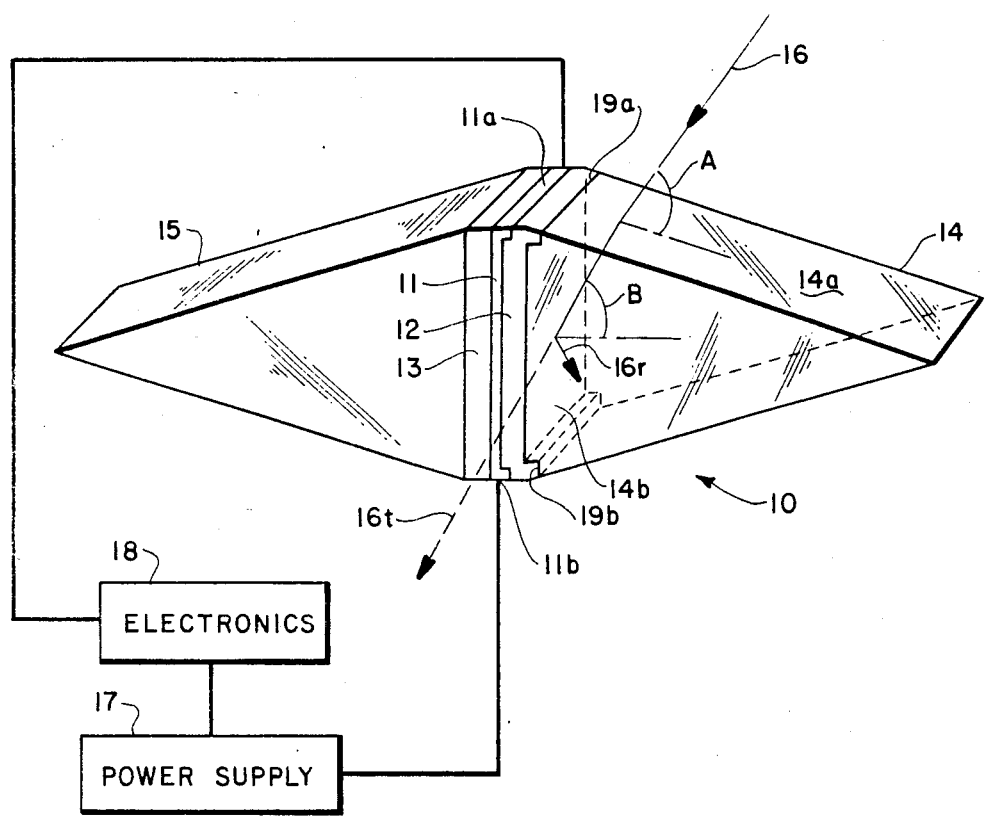

METAL FILM LIGHT MODULATOR

RIGHTS OF THE GOVERNMENT

The invention described herein may be manufactured and used by or for the Government of the United States for all governmental purposes without the payment of any royalty.

BACKGROUND OF THE INVENTION

The present invention relates generally to optical modulators, and more particularly to a device for modulating light transmission through a metallic film.

The invention described herein comprises an improvement on a previously described device, wherein the intensity of a directed light beam may be modulated by transmission through or reflection off a metallic film. A theoretical discussion of the principles forming a foundation of the invention and of experimental work related thereto may be found in "Hight Transparency of Classically Opaque Metallic Films", by R. Dragila et al. Phys Rev Lett 55:10, 1117-20 (2 Sep 85), hereinafter called "the reference", the same being incorporated herein by reference. The structure described in the reference consists of a metal layer sandwiched between layers of a dielectric. Transmission of light through the metal layer obtains if proper selection of materials is made for the structure of the device with respect to layer thickness and dielectric constants, dimensions, and wavelength and incidence angle of an impinging light beam. Operational characteristics of the device of the reference are defined by the solution to Maxwell's equation set forth in the reference, including geometry and physical constants for achieving optimal transmission or reflection of a light beam at the metal layer of the structure. However, the solutions to Maxwell's equation presented in the reference are not valid if the boundary conditions of the metal layer are changed. Accordingly, the invention describes an improved optical modulator wherein an electric, magnetic or electromagnetic field is impressed on the metallic film of the device to selectively alter, and thereby modulate, transmittance and reflectance of an impinging light beam of selected wavelength, the characteristics of which are substantially different than in the absence of an impressed field. The fields required for modulation of the light beam may be imposed by conducting a current through the metal layer or by applying microwave, millimeter wave or laser radiation into the surface of the metal layer, the controlled time variation of which results in desired modulation of the transmitted or reflected beam intensity.

It is, therefore, a principal object of the invention to provide an improved light modulator.

It is a further object to provide a device for modulating light by controlling the transmission thereof through a metallic film.

It is another object to provide a device wherein the transmission of light through a metallic film is controlled by the application of an electric, magnetic or electromagnetic field.

These and other objects of the invention will become apparent as the detailed description of representative embodiments proceeds.

SUMMARY OF THE INVENTION

In accordance with the foregoing principles and objects of the invention, an improved device for modulating the intensity of a light beam is described which comprises a first isoceles optical prism; a first dielectric layer, a thin metallic layer, and a second dielectric layer substantially identical in composition and thickness to the first dielectric layer deposited successively on the base of the first prism; a second isoceles optical prism disposed with the base thereof contacting the last deposited layer; and a controllable source of electrical current connected to the metallic layer for establishing and modulating an electromagnetic field at the respective surfaces of the metallic layer.

DESCRIPTION OF THE DRAWINGS

The invention will be more clearly understood from the following detailed description of a representative embodiment thereof read in conjunction with the accompanying drawing which is a schematic in three dimensions of a light modulator of the invention.

DETAILED DESCRIPTION

Referring now to the accompanying drawing, shown therein is a three dimensional schematic of a representative embodiment of the light modulator 10 of the invention. In accordance with teachings of the reference, a metallic layer 11 comprising the modulating layer of the device is sandwiched between a pair of substantially identical, transparent dielectric layers 12,13 of selected dielectric constant (from about 1.2 to about 3.0). Layers 11,12,13 are applied to a transparent substrate using standard deposition techniques. Layers 12 and 13 must have an index of refraction larger than that of layer 11. The substrate comprised an isoceles optical prism 14 of suitable optical material, viz., borosilicate-crown-glass (index of refraction 1.515), upon which layers 11,12,13 were deposited. The index of refraction of prisms 14,15 must be larger than that of layers 12,13. In order to provide symmetry to the device, an optional isoceles prism 15, substantially identical to prism 14, may be placed in contact with layers 11,12,13 and in base-to-base relationship to prism 14 as suggested in the drawing. Layer 11 may comprise silver, aluminum, gold sodium, potassium, mercury, copper, iron, or other suitable metal selected depending upon the wavelength of light to be modulated and with a dielectric constant as small as possible, certainly smaller than that of layers 12,13. Layers 12,13 are selected to have an index of refraction substantially different from either that of layer 11 or of prisms 14,15, and may include magnesium flouride, other inorganic or organic compounds or glasses with dielectric constants between 1.5 and 3.0 and suitable transmission properties for the light to be modulated. Magnesium fluoride (index of refraction 1.38) was selected for layers 12,13, and silver (index of refraction about 0.066), desirable for use in the visible region of the spectrum, was selected for layer 11 for the purpose of description herein. Layer 11 is normally in the range of from about 20 nm to about 200 nm in thickness, and layers 12,13 are substantially thicker (about 10×) than layer 11. The silver layer 11 is, accordingly, of the order of 60 nm thick, and layers 12,13 are about 600 nm thick. The interfaces between layers 11,12,13 and between layers 12,13 and prisms 14,15 should exhibit abrupt changes of the respective indices which can be accomplished by successive evaporation of the three layers onto the base of one prism and placing the base of the second prism onto the evaporated layer structure using ethyl salicylate (index of refraction 1.52) as an index matching fluid. An apex angle for each prism 14,15 is selected at about 25° so that a light beam 16 of selected wavelength directed through a first primary face 14a of prism 14 at preselected angle A impinges on the base 14b at an appropriate preselected angle B to a normal to base 14b.

In device 10 of the invention, an electric, magnetic or electromagnetic field is impressed at the surfaces of layer 11 to selectively alter, and thereby modulate, the transmittance and reflectance of beam 16. The fields (up to several millivolts/cm) required for modulation of beam 16 may be impressed by conducting a current (about 0.1 mamp to about 200 mamp) through layer 11 or by applying microwave, millimeter wave or laser radiation into the surface of layer 11. Accordingly, power supply 17 may be operatively connected to layer 11 to provide a source of current for establishing the desired field at the surface of layer 11. Controllable current modulating electronics 18 such as a signal controlled amplifier are operatively interconnected with power supply 17 and layer 11 to provide controlled time variation of current flowing through layer 11 which results in the desired modulation of the transmitted light beam 16t or reflected light beam 16r intensities. Contacts on layer 11 for interconnection thereof with power supply 17 and electronics 18 may comprise electrical tabs on layer 11 deposited in the form of narrow metallic strips 11a,b on opposite sides of the first applied transparent layer (layer 12 in the drawing) substantially as shown, prior to deposition of layer 13. Electrical connection of layer 11 with power supply 17 and electronics 18 may then be made either mechanically or by solder connections. A greater layer 12 thickness at the edges thereof for acommodating strips 11a,b may be provided by including in the base of prism 14 along opposite sides thereof a pair of recesses 19a,b.

In the operation of device 10 of the invention, layer 11 becomes transparent through the coupling of surface waves of its opposite surfaces, where the surface waves are introduced and extracted by proper matching of dielectric layers 12,13 and are changed by the application of a controllable electric, magnetic or electromagnetic field. Maximum transmission of a p-polarized beam 16 of 632.8 nm wavelength will occur when directed at angle B of approximately 75° and in a plane parallel to a triangular surface of prism 14. Angle B and the angle of the apex angle of prisms 14,15 are functions of the refractive indices of layers 11,12,13 and of prisms 14,15. If, for example, the difference between the refractive index of layers 12,13 and that of prisms 14,15 is increased, the apex angles of prism 14 can be made larger, up to 180°, i.e., the prism could be substituted by a flat plate. Current flowing through layer 11 induces a magnetic field, changes the boundary conditions for the wave propagation at the interfaces of layers 11,12,13, and thus decreases overall transmitted beam 16t intensity. High frequency variation of the intensity of transmitted beam 16t may be achieved by varying the current at a high frequency.

The invention as herein described therefore provides a novel device for modulating the transmission of a light beam through a metallic film. It is understood that certain modifications to the invention as described may be made, as might occur to one with skill in the field of the invention, within the scope of the appended claims. Therefore, all embodiments contemplated hereunder which achieve the objects of the invention have not been shown in complete detail. Other embodiments may be developed without departing from the spirit of the invention or from the scope of the appended claims.

We claim:

1. A device for modulating the intensity of a light beam, comprising:
   (a) a thin metallic layer defining respective first and second surfaces thereof and having first index of refraction;
   (b) substantially identical first and second dielectric layers on respective said first and second surfaces of said thin metallic layer, said first and second dielectric layers having second index of refraction larger than said first index of refraction;
   (c) a substantially transparent substrate supporting said thin metallic layer and said first and second dielectric layers and in laminar contact with one of said first and second dielectric layers, said substrate having third index of refraction larger than said second index of refraction;
   (d) a source of electrical current operatively connected to said thin metallic layer for establishing at respective said first and second surfaces of said thin metallic layer one of an electric, magnetic or electromagnetic field; and
   (e) means interconnecting said source and said thin metallic layer for selectively modulating the intensity of said field.

2. The device as recited in claim 1 wherein said thin metallic layer comprises a metal selected from the group consisting of silver, gold, aluminum, sodium, potassium, mercury, copper, and iron deposited to a thickness of from about 20 to about 200 nm.

3. The device as recited in claim 1 wherein said first and second dielectric layers have thickness of from about 200 to about 2000 nm.

4. The device as recited in claim 1 wherein said substrate comprises the base of a first isoceles prism and further comprising a second isoceles prism substantially identical to said first isoceles prism, the base of said second isoceles prism being disposed in laminar contact with the other of said first and second dielectric layers.

* * * * *